US008521373B2

(12) United States Patent
Behncke et al.

(10) Patent No.: US 8,521,373 B2
(45) Date of Patent: Aug. 27, 2013

(54) INDUSTRIAL TRUCK WITH HEIGHT-ADJUSTABLE LOAD BEARING MEANS

(75) Inventors: Christoph Behncke, Bad Segeberg (DE); Matthias Düwel, Norderstedt (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 75 days.

(21) Appl. No.: 13/267,388

(22) Filed: Oct. 6, 2011

(65) Prior Publication Data

US 2012/0089305 A1 Apr. 12, 2012

(30) Foreign Application Priority Data

Oct. 7, 2010 (DE) ........................ 10 2010 048 662

(51) Int. Cl.
*G06F 19/00* (2011.01)

(52) U.S. Cl.
USPC ............. 701/50; 318/600; 414/635; 187/223; 700/218; 700/50

(58) Field of Classification Search
None
See application file for complete search history.

(56) References Cited

U.S. PATENT DOCUMENTS

| | | | | | |
|---|---|---|---|---|---|
| 3,818,302 | A | * | 6/1974 | Rutledge | 318/600 |
| 4,509,127 | A | * | 4/1985 | Yuki et al. | 700/218 |
| 4,547,844 | A | * | 10/1985 | Adams | 700/84 |
| 4,598,797 | A | * | 7/1986 | Schultz | 187/223 |
| 7,287,625 | B1 | | 10/2007 | Harris | |
| 2005/0281657 | A1 | * | 12/2005 | Schuchard | 414/635 |
| 2006/0042804 | A1 | * | 3/2006 | Pecchio | 172/4.5 |

FOREIGN PATENT DOCUMENTS

| | | |
|---|---|---|
| DE | 2114617 | 9/1972 |
| DE | 3306463 | 9/1984 |
| DE | 3629089 | 3/1988 |
| EP | 0800129 | 10/1997 |
| EP | 1604942 | 12/2005 |
| WO | 2009130528 | 10/2009 |

* cited by examiner

*Primary Examiner* — Thomas Tarcza
*Assistant Examiner* — Garrett Evans
(74) *Attorney, Agent, or Firm* — Vidas, Arrett & Steinkraus, P.A.

(57) ABSTRACT

An industrial truck having height-adjustable load bearing means, lifting height controls in which a plurality of predetermined lifting heights are saved, a lifting height detection system for the load bearing means that detects an actual value of the lifting height and provides it to the lifting height controls, and a control unit that allows the lifting height of the load bearing means to be manually adjusted at different speeds, wherein the lifting height controls move the load bearing means to one of the predetermined lifting heights when the speed for adjusting the load bearing means specified by the control unit falls below a predetermined threshold, wherein the lifting height assumed by the lifting height controls corresponds to the lifting height of the predetermined lifting heights that most closely approximates the actual value of the lifting height in the direction in which the load bearing means is moving.

10 Claims, 2 Drawing Sheets

INDUSTRIAL TRUCK WITH HEIGHT-ADJUSTABLE LOAD BEARING MEANS

CROSS-REFERENCE TO RELATED APPLICATIONS

Not applicable

STATEMENT REGARDING FEDERALLY SPONSORED RESEARCH

Not applicable

BACKGROUND OF THE INVENTION

The present application relates to an industrial truck, especially a reach truck, having height-adjustable load bearing means, lifting height controls for the load bearing means in which a plurality of predetermined lifting heights are saved for the load bearing means.

From the prior art, it is known that a user can preselect a lifting height when positioning load bearing means. The load bearing means is occasionally also called load lifting means. The user directly controls the lifting or respectively stacking process and receives information via a display about the current lifting height of the load bearing means.

With the system known from the prior art, it is possible to preselect the stacking level to be approached by entering the corresponding series of characters and pressing a button for storage or removal. In a display, a positioning aid for the load bearing means is offered that, for example, flashes more quickly when the selected stacking level is approached, and for example automatically slows down the lifting or lowering process of the load bearing means so that the user can precisely approach the preselected stacking level. The difference from the target can also be displayed when approaching.

BRIEF SUMMARY OF THE INVENTION

It is the object of the invention to provide an industrial truck having a height-adjustable load bearing means that, in a simple manner, helps an operator assume a desired lifting height when approaching.

The industrial truck according to the invention possesses an adjustable load bearing means as well as lifting height controls for the load bearing means. Several predetermined lifting heights for the load bearing means are saved in the lifting height controls. The predetermined lifting heights refer to the heights of the warehouse or warehouse areas in which the industrial truck is to be used. In addition, the industrial truck is equipped with a lifting height detection system for the load bearing means that detects the actual value of the lifting height of the load bearing means and notifies the lifting height controls. Furthermore, the industrial truck according to the invention possesses a control unit that allows the lifting heights of the load bearing means to be manually adjusted at different speeds. This makes it possible to specify the speed continuously or at least on two levels, and a control unit that only permits control at a maximum speed or the speed zero is also a possible control unit for the industrial truck according to the invention. According to the invention, the lifting height controls move the load bearing means to one of the predetermined lifting heights when the speed for adjusting the load carrying means specified by the control unit lies below a predetermined threshold. For the lifting height that is to be assumed, the lifting height controls choose the lifting height from the plurality of predetermined lifting heights that most closely approximates the actual value of the lifting height in the direction in which the load bearing means is moving. If the specified speed for moving the load bearing means falls below the threshold, the predetermined lifting height—proceeding from the current actual value for the lifting height—that can be assumed next in the direction in which the load bearing means is moving is assumed by the lifting height controls. In terms of professional jargon, the assumption of the next lifting height in the direction of movement can be termed "snapping in."

In one preferred embodiment, the lifting height controls discerns whether the lifting height to be assumed is for storage or removal. If the lifting height controls assume a lifting height for storing a load that is on the load bearing means, the lifting height is higher by a predetermined height amount than when removing. In one possible embodiment, a control unit is designed for manually selecting storage or removal. In an alternative embodiment, the load bearing means can be equipped with a load sensor that notifies the lifting height controls whether or not a load is on the load bearing means. In this case, when a lifting height is being approached with a load, the lifting height controls can assume a corresponding lifting height higher by the predetermined height amount than when removing.

In one preferred embodiment, the industrial truck according to the invention is designed as a reach truck. It is however possible for each lifting industrial truck that is capable of assuming different lifting heights to be designed according to the invention.

The lifting height is preferably detected incrementally during the mast lift of a reach truck with free lift and mast lift. The transition from free lift to mast lift serves as a reference position for the incremental detection of lift height.

In one preferred embodiment, the threshold for the specified speed of the load bearing means is 60% and preferably 80% of the speed specified by the control unit. The threshold can preferably be freely specified by a user of the industrial truck. The threshold allows an operator to move at maximum speed while approaching the desired lift height and then, before the desired lift height is reached, reduce the speed of the load bearing means which is automatically moved by means of the lifting height controls into the desired lifting height.

To control the lifting height, the lifting height controls and/or the control unit is provided with a display that displays when the approached lifting height is reached.

BRIEF DESCRIPTION OF THE SEVERAL VIEWS OF THE DRAWINGS

The invention will be further explained below using an exemplary embodiment. In the figures.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

Figure 1:
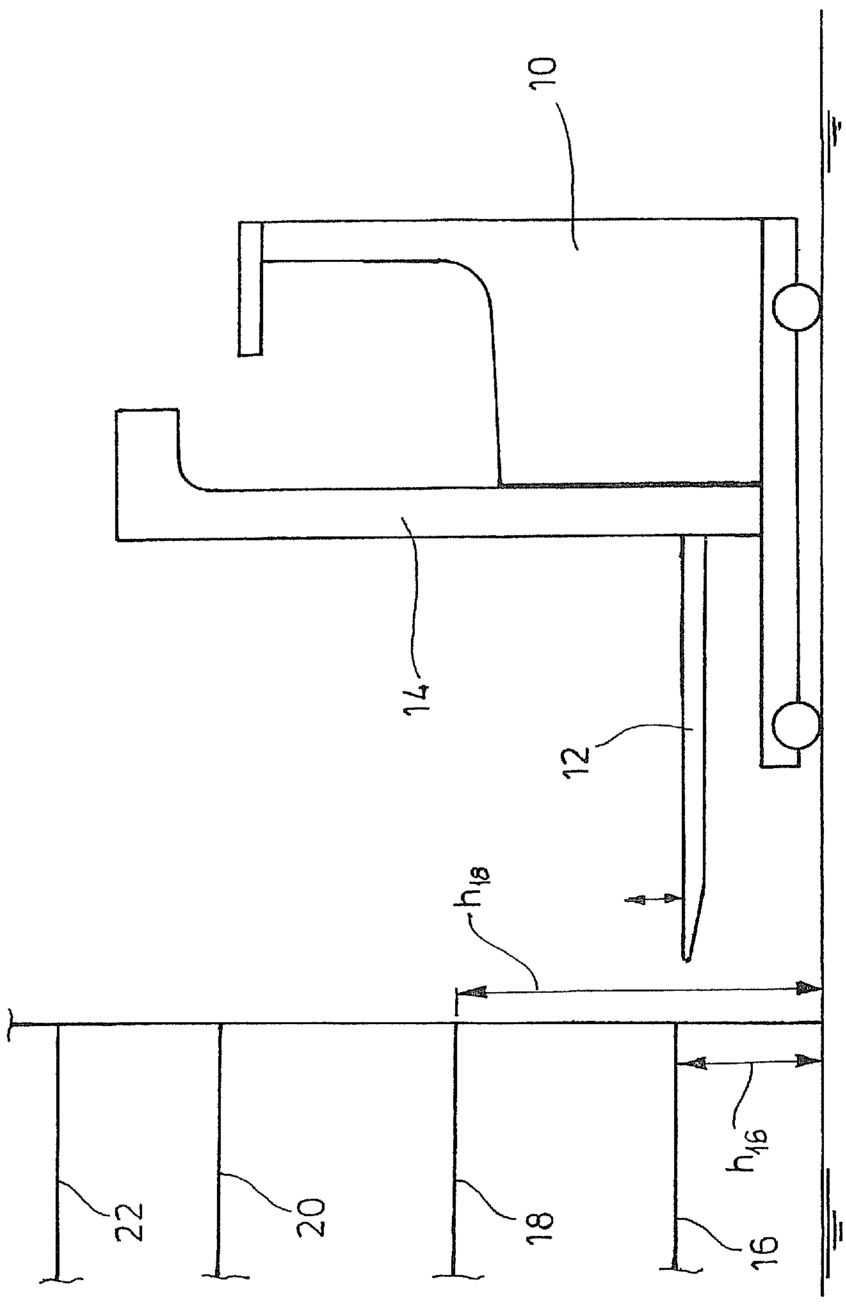
FIG. 1 shows a schematic view from the side of a reach truck in front of shelves with different stacking levels.

FIG. 1 shows a schematic view of a reach truck 10 with lift forks 12 adjustable in height along a mast 14. As usual, the mast 14 can be designed with two or three mast segments that can also be extended to lift the load bearing means. The reach truck 10 is set up with its lifting height controls (see FIG. 2) to assume the schematically portrayed stacking levels 16, 18, 20, 22 for storing and removing loads. The heights of the stacking levels are only shown as examples in FIG. 1.

Each stacking level is assigned a lifting height in the controls; for example, to stacking level 16 is assigned lifting height $h_{16}$, and to stacking level 18 is assigned lifting height $h_{18}$. The lifting heights are set for example by a service technician when commissioning the industrial truck and are saved in the lifting height controls.

When the shelves are approached without a load, the lift forks 12 are automatically moved in the manner described below to the corresponding lifting height by the lifting height controls. Then the lift forks 12 are subsequently inserted manually into the shelves whereby the lift forks are moved under the load to be picked up, for example into the palette to be picked up. Then the load is manually lifted free without moving the lift forks so that the picked up palette no longer lies on the shelf. Then the lift forks 12 are retracted to remove the palette from the shelf so that it can be transported after the lift forks are lowered. When assuming a lifting height with a load, first a lifting height is assumed that is approximately 150 mm higher than the lifting height assumed when removing. Then the lift forks 12 together with the load on them are manually moved into the shelves, and when the palate is completely within the shelves, the load is manually lowered so that the palate rests on the shelf. After the lift forks 12 are lowered again, the lift forks are released and can be removed from the shelves and from under the load. With the lifting height controls according to the invention, only the assumption of the desired lifting height is automatic; the insertion of the lift forks 12 into the shelves and the lifting and lowering of the lift forks 12 in the shelves is manual or supported by a separate assistant system.

Figure 2:
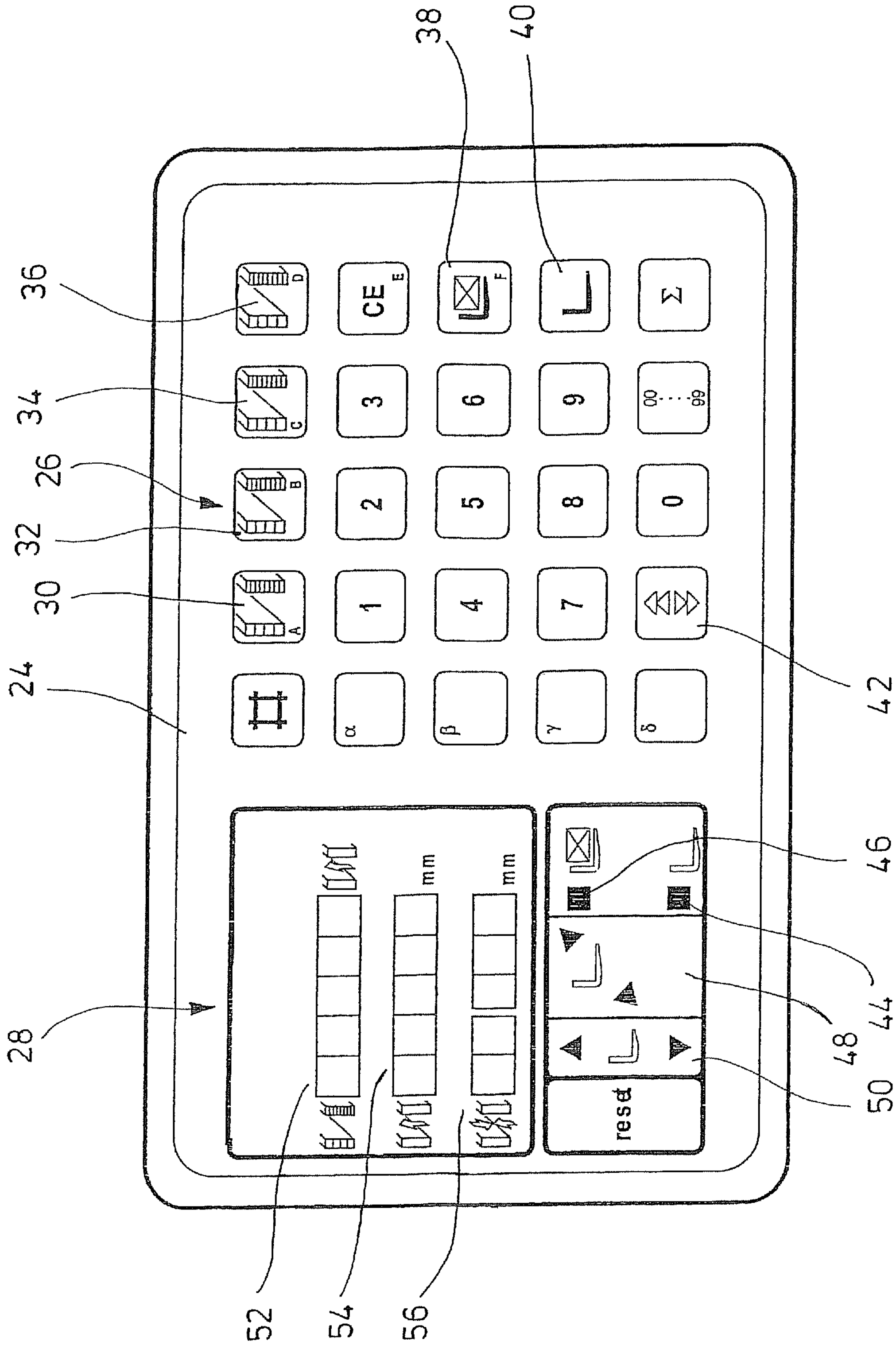
FIG. 2 shows a control unit that enables the automatic selection of the desired lifting height.

FIG. 2 shows a control unit 24 for the lifting height controls. The control unit 24 has control fields 26 in its right section that can be actuated by the driver of the industrial truck. The left section of the control unit 24 is equipped with display elements 28. By means of the control fields, 30, 32, 34, 36, a storage area can be selected in which the work is carried out. By selecting one of the control fields for the storage area, the saved lifting heights are activated for the respective storage areas in the lifting height controls. The control field 38 can be actuated to display that a storage job exists. The control field 40 can be selected to display that a removal job exists. If control field 38 has been actuated and the lifting height controls were notified that a storage job exists, the selected lifting height is raised approximately 150 mm so that the driver of the industrial truck can manually place the load on the shelf.

The control unit 42 activates the snap-in mode of the lifting height controls. In this mode, the lifting controls independently go to the first shelf that is available when the speed falls below a predetermined threshold. With reference to FIG. 1, this means that when the lift forks 12 are for example moved above height $h_{18}$ and lifting height $h_{20}$ for shelf 20 has not been exceeded, the lifting height controls automatically move the lift forks to lifting height $h_{20}$ when the lifting speed of the lift forks decreases. The lifting height controls discern whether a storage or removal job exists. If a storage job exists, the shelf 20 is approached approximately 150 mm higher than if a removal job 40 exists.

In the display field 28, the user is shown by the display fields 44 and 46 whether a storage or removal job exists. The display field 48 is illuminated when the lifting height necessary for the job is reached, that is, when the target height is reached and storage or respectively removal can occur. The display 50 shows the user the direction toward the target height, i.e., that either lifting or lowering should occur.

Display 52 shows the user which of the storage areas was selected. Display 54 shows the absolute lifting height in mm. Display 56 shows the user the deviation from the desired lifting height in mm.

Once the actuation field 42 for snap-in mode is activated, the next shelf height is automatically assumed corresponding to the direction of movement of the lift forks. This means that when the lift forks are being lifted, the next higher stacking level is assumed, and when the lift forks are being lowered, the next lower level is assumed. If the lift forks are above the top stacking level, the lifting height controls ensure that the top stacking level is automatically selected and assume the desired lifting height.

The above disclosure is intended to be illustrative and not exhaustive. This description will suggest many variations and alternatives to one of ordinary skill in this art. All these alternatives and variations are intended to be included within the scope of the claims where the term “comprising” means “including, but not limited to”. Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The invention claimed is:

1. An industrial truck having height-adjustable load bearing means, lifting height controls for the load bearing means in which a plurality of predetermined lifting heights are saved for the load bearing means, a lifting height detection system for the load bearing means that detects an actual value of the lifting height of the load bearing means and provides it to the lifting height controls, and a control unit that allows the lifting height of the load bearing means to be manually adjusted at different speeds, characterized in that the lifting height controls move the load bearing means to one of the predetermined lifting heights when the speed for adjusting the load bearing means specified by the control unit falls below a predetermined threshold, wherein the lifting height assumed by the lifting height controls corresponds to the lifting height of the predetermined lifting heights that most closely approximates the actual value of the lifting height in the direction in which the load bearing means is moving.

2. The industrial truck according to claim 1, characterized in that the lifting height assumed by the lifting height controls is higher when storing by a predetermined lifting amount than when removing.

3. The industrial truck according to claim 2, characterized in that the control unit allows the manual selection of whether the load bearing means should store or remove.

4. The industrial truck according to claim 2, characterized in that a load sensor is provided that notifies the lifting height controls of whether or not a load is on the load bearing means, and the lifting height controls assume the lifting height for storing when approaching with a load.

5. The industrial truck according to one of claim 1, characterized in that a reach truck is provided as the industrial truck.

6. The industrial truck according to claim 5, characterized in that the lifting height detection system incrementally detects the lifting height during a mast lift.

7. The industrial truck according to one of claim 1, characterized in that the threshold for the specified speed of the load bearing means is 60% at least of the speed of the load bearing means specified by the control unit.

8. The industrial truck according to one of claim 1, characterized in that the threshold for the specified speed can be set by a user.

9. The industrial truck according to one of claim 1, characterized in that the lifting height controls and/or the control unit has a display that indicates when the approached lifting height is reached.

10. The industrial truck according to one of claim 1, characterized in that the threshold for the specified speed of the load bearing means is at least 80% of the speed of the load bearing means specified by the control unit.

* * * * *

UNITED STATES PATENT AND TRADEMARK OFFICE

CERTIFICATE OF CORRECTION

PATENT NO. : 8,521,373 B2
APPLICATION NO. : 13/267388
DATED : August 27, 2013
INVENTOR(S) : Behncke et al.

It is certified that error appears in the above-identified patent and that said Letters Patent is hereby corrected as shown below:

In the Claims

Column 6, line 6, claim 7, delete “at least” after 60% and insert --at least-- before 60%

Signed and Sealed this
Twenty-second Day of October, 2013

Teresa Stanek Rea
*Deputy Director of the United States Patent and Trademark Office*